(12) United States Patent
Steger

(10) Patent No.: US 12,326,563 B1
(45) Date of Patent: Jun. 10, 2025

(54) CANTILEVERED WAVEGUIDE FOR EXTENDED REALITY GLASSES

(71) Applicant: Snap Inc., Santa Monica, CA (US)

(72) Inventor: Stephen Andrew Steger, Los Angeles, CA (US)

(73) Assignee: SNAP INC., Santa Monica, CA (US)

( * ) Notice: Subject to any disclaimer, the term of this patent is extended or adjusted under 35 U.S.C. 154(b) by 135 days.

(21) Appl. No.: 18/135,371

(22) Filed: Apr. 17, 2023

(51) Int. Cl.
   *G02B 27/01* (2006.01)
   *G02B 6/42* (2006.01)

(52) U.S. Cl.
   CPC ....... *G02B 27/0172* (2013.01); *G02B 6/4219* (2013.01); *G02B 27/0176* (2013.01); *G02B 2027/0178* (2013.01)

(58) Field of Classification Search
   CPC ............. G02B 27/0172; G02B 6/4219; G02B 27/0176; G02B 2027/0178
   See application file for complete search history.

(56) References Cited

U.S. PATENT DOCUMENTS

| | | | |
|---|---|---|---|
| 2019/0012540 A1* | 1/2019 | Trail | H04N 23/11 |
| 2024/0126087 A1* | 4/2024 | Gera | G02B 7/022 |
| 2024/0280824 A1* | 8/2024 | Young | G02B 27/0172 |

* cited by examiner

*Primary Examiner* — Pegeman Karimi
(74) *Attorney, Agent, or Firm* — SCHWEGMAN LUNDBERG & WOESSNER, P.A.

(57) ABSTRACT

A device includes a frame and a waveguide. The waveguide has a first end fixedly coupled to a first portion of the frame, and a second end proximal to a second portion of the frame and detached from the frame. When the frame deforms to displace the first portion and the second portion relative to each other, the second end of the waveguide is not displaced relative to the first end of the waveguide as a result of the frame deforming.

20 Claims, 12 Drawing Sheets

CANTILEVERED WAVEGUIDE FOR EXTENDED REALITY GLASSES

TECHNICAL FIELD

The present disclosure relates generally to display devices and more particularly to display devices used for extended reality.

BACKGROUND

A head-worn device may be implemented with a transparent or semi-transparent display through which a user of the head-worn device can view the surrounding environment. Such devices enable a user to see through the transparent or semi-transparent display to view the surrounding environment, and to also see objects or other content (e.g., virtual objects such as 3D renderings, images, video, text, and so forth) that are generated for display to appear as a part of, and/or overlaid upon, the surrounding environment (referred to collectively as "virtual content"). This is typically referred to as "extended reality" or "XR", and it encompasses techniques such as augmented reality (AR), virtual reality (VR), and mixed reality (MR). Each of these technologies combines aspects of the physical world with virtual content presented to a user.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
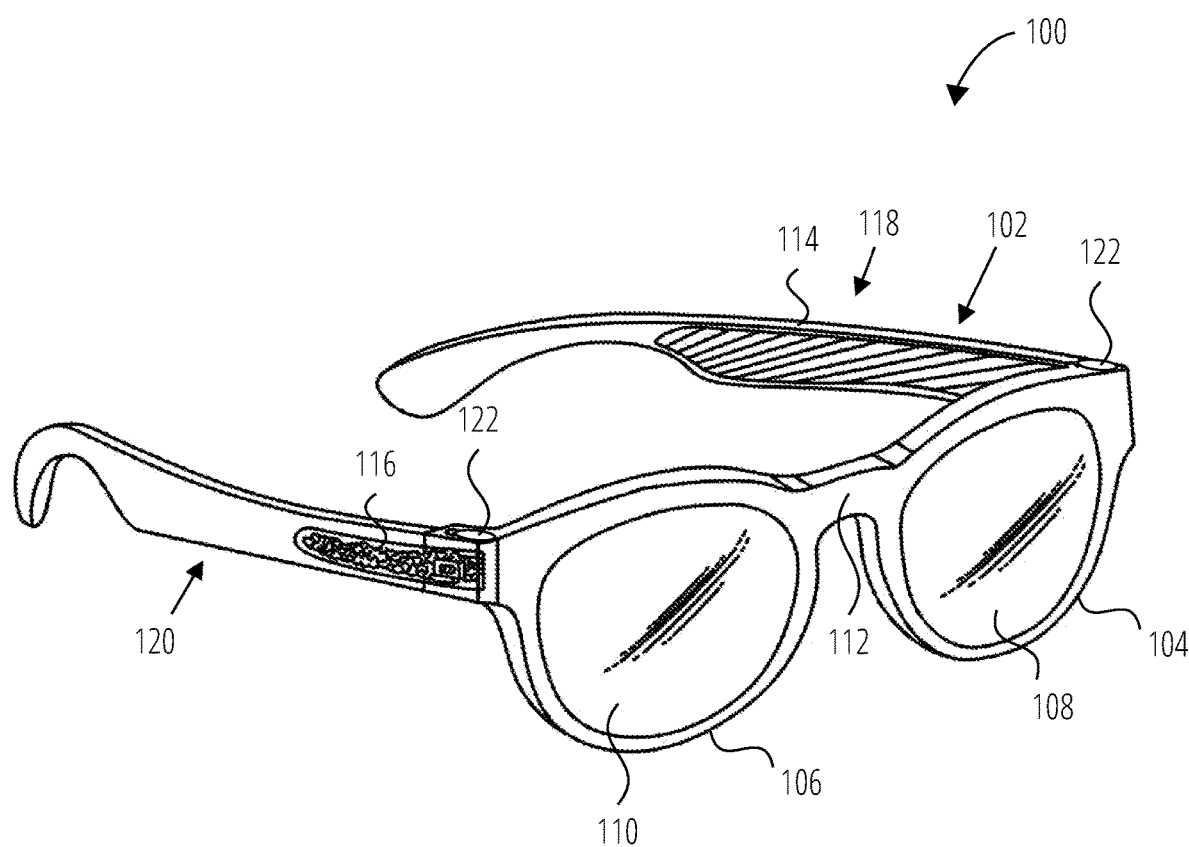
FIG. 1 is a perspective view of a head-worn device, in accordance with some examples.

XR displays are typically categorized as video pass-through displays or optical see-through displays. In video pass-through, a view of the physical environment is captured by a camera, combined with virtual content, and then presented to the user on an opaque display. In optical see-through, a user views the physical environment directly through transparent or translucent displays that interpose virtual content between the user's eyes and the physical environment.

Optical see-through XR displays face a number of technical challenges in presenting realistic-looking virtual content to the user's eyes while permitting a relatively unobstructed see-through view of the physical environment. The reflectors, waveguides, diffractive gratings, and other optical components typically used in transparent or translucent XR display design often require trade-offs among various factors, including the brightness and visual quality of the virtual content, the width of the field of view for the presented virtual content, the amount of light from the physical environment passing through the transparent or translucent display, and the size, battery life, and physical robustness or resilience of the head-worn device housing the display.

In particular, the transparent waveguides used to propagate projected light toward the user's eyes are often designed to very tight tolerances, and the visual quality of the image presented to the user is highly sensitive to any physical imperfections or deformations of the waveguides.

A device worn on a user's head, having a finite level of stiffness, will likely result in the frame deflecting when worn, and the waveguide glass that is fixed within the frame may also deflect. Ordinarily, when the frame of a device deforms—for example, when a pair of glasses is placed on a user's head, causing the arms to deflect outward to grip the sides of the user's head, thereby causing the frame to bend—the two ends of a waveguide coupled to the frame will be displaced relative to each other, thereby loading the waveguide with forces such as twisting, shearing, compression, and/or tension forces. Waveguide displays inside XR eyewear devices can be very sensitive to bending: when the waveguide glass deflects from its nominal flat shape between an input coupler (for coupling light into the waveguide) and output coupler (for coupling light out of the waveguide toward the user's eye), it affects the diffraction of light within the waveguide and can have negative effects on the optical quality of the display, especially the modulation transfer function (MTF). More waveguide deflection will typically result in reduced MTF, thereby diminishing the optical quality of images presented by the display.

In some examples described herein, a waveguide is coupled to a frame at only one end of the waveguide. The detached end of the waveguide is able to move freely without exerting any mechanical forces on the waveguide as a result of the deformation of the frame. Thus, some examples described herein attempt to address one or more technical problems associated with the presentation of virtual content by optical see-through XR displays or other light projection devices using waveguides.

Other technical features may be readily apparent to one skilled in the art from the following figures, descriptions, and claims.

FIG. 1 is perspective view of a head-worn XR device (e.g., glasses 100), in accordance with some examples. The glasses 100 can include a frame 102 made from any suitable material such as plastic or metal, including any suitable shape memory alloy. In one or more examples, the frame 102 includes a first or left optical element holder 104 (e.g., a display or lens holder) and a second or right optical element holder 106 connected by a bridge 112. A first or left optical element 108 and a second or right optical element 110 can be provided within respective left optical element holder 104 and right optical element holder 106. The right optical element 110 and the left optical element 108 can be a lens, a display, a display assembly, or a combination of the foregoing, incorporating a waveguide as described below with reference to FIG. 2 through FIG. 9.

The frame 102 additionally includes a left arm or temple piece 118 and a right arm or temple piece 120. In some examples the frame 102 can be formed from a single piece of material so as to have a unitary or integral construction.

The glasses 100 can include a computing device, such as a computer 116, which can be of any suitable type so as to be carried by the frame 102 and, in one or more examples, of a suitable size and shape, so as to be partially disposed in one of the temple piece 118 or the temple piece 120. The computer 116 can include one or more processors with memory, wireless communication circuitry, and a power source. As discussed below, the computer 116 comprises low-power circuitry, high-speed circuitry, and a display processor. Various other examples may include these elements in different configurations or integrated together in different ways.

The computer 116 additionally includes a battery 114 or other suitable portable power supply. In some examples, the battery 114 is disposed in left temple piece 118 and is electrically coupled to the computer 116 disposed in the right temple piece 120. The glasses 100 can include a connector or port (not shown) suitable for charging the battery 114, a wireless receiver, transmitter or transceiver (not shown), or a combination of such devices.

User input may be provided by one or more buttons 122, which in the illustrated examples are provided on the outer upper edges of the left optical element holder 104 and right optical element holder 106. The one or more buttons 122 provide a means whereby the glasses 100 can receive input from a user of the glasses 100.

Figure 2:
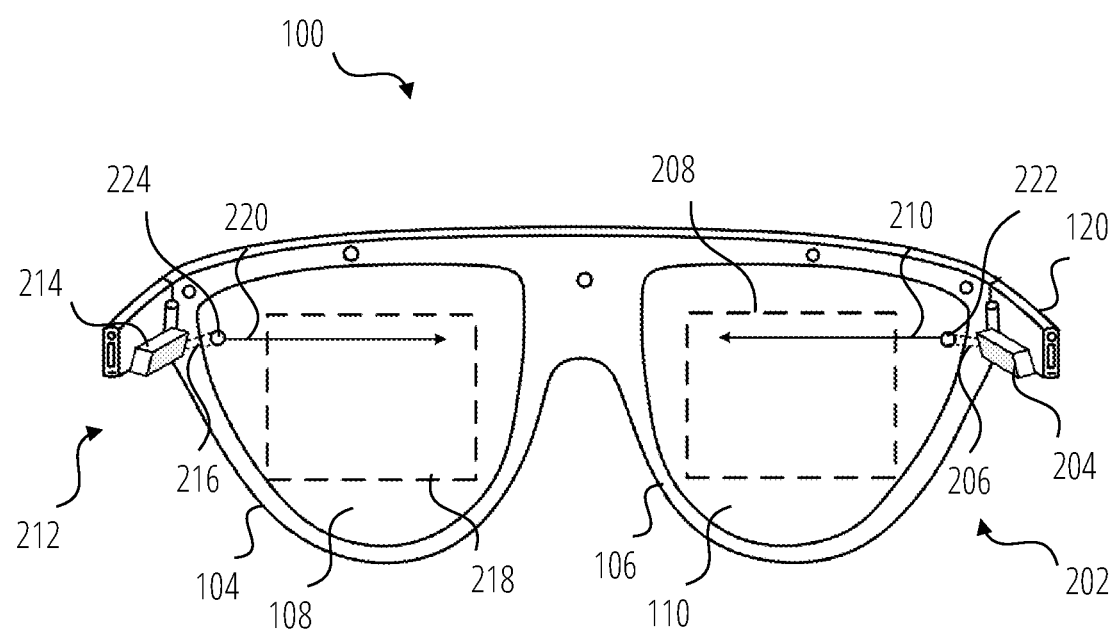
FIG. 2 illustrates a rear view of the head-worn device of FIG. 1, in accordance with some examples.

FIG. 2 illustrates the glasses 100 from the perspective of a user. For clarity, a number of the elements shown in FIG. 1 have been omitted. As described in FIG. 1, the glasses 100 shown in FIG. 2 include left optical element 108 and right optical element 110 secured within the left optical element holder 104 and the right optical element holder 106, respectively.

The glasses 100 include forward optical assembly 202 comprising a right projector 204 and a right near eye display 208, and a forward optical assembly 212 including a left projector 214 and a left near eye display 218. The forward optical assembly 202 may also be referred to herein, by itself or in combination with one or both of the respective optical elements 108, 110, as an optical see-through XR display.

In some examples, the near eye displays are waveguides. The waveguides include reflective or diffractive structures (e.g., gratings and/or optical elements such as mirrors, lenses, or prisms). On the right side of the glasses 100, projected light 206 emitted by the projector 204 encounters the input optical element 222 (e.g., diffractive structure) of the waveguide of the near eye display 208, which directs the projected light 206 as light 210 towards the right eye of a user to provide an image on or in the right optical element 110 that overlays the view of the real world seen by the user. Similarly, projected light 216 emitted by the projector 214 encounters the input optical element 224 (e.g., diffractive structure) of the waveguide of the near eye display 218, which directs the projected light 216 as light 220 towards the left eye of a user to provide an image on or in the left optical element 108 that overlays the view of the real world seen by the user. The combination of a GPU, the forward optical assembly 202, the left optical element 108, and the right optical element 110 provide an optical engine of the glasses 100. The glasses 100 use the optical engine to generate a virtual content overlay on the real world view of the user including display of a 3D user interface to the user of the glasses 100. The surface of the optical element 108, 110 from which the projected light exits toward the user's eye is referred to as a user-facing surface of the optical see-through XR display.

In use, a user of the glasses 100 will be presented with information, content and various 3D user interfaces on the near eye displays 208, 218. The user can then interact with the glasses 100 using the buttons 122, voice inputs or touch inputs on an associated device.

In some examples, one or more further optical lenses may be used to adjust the presentation of the virtual content to the user's eye. For example, lenses can be placed on the user-facing side and/or the exterior side of the near eye display 208 or 218 to modulate the plane in front of the user's eye where the virtual content appears, i.e., to adjust the perceived distance of the virtual content from the user's eye. The near user-facing side lens (also called an eye-side lens) affects the perceived distance of the virtual content in front of the user; while the exterior side lens (also called a world-side lens) is provided to neutralize the effect of the near side lens on real-world objects. In some examples, an ophthalmic lens can be positioned on the eye side of the near eye display 208 or 218 to allow users needing visual correction to correctly perceive the virtual content. It will be appreciated that examples described herein can be combined with various XR display designs.

Figure 3:
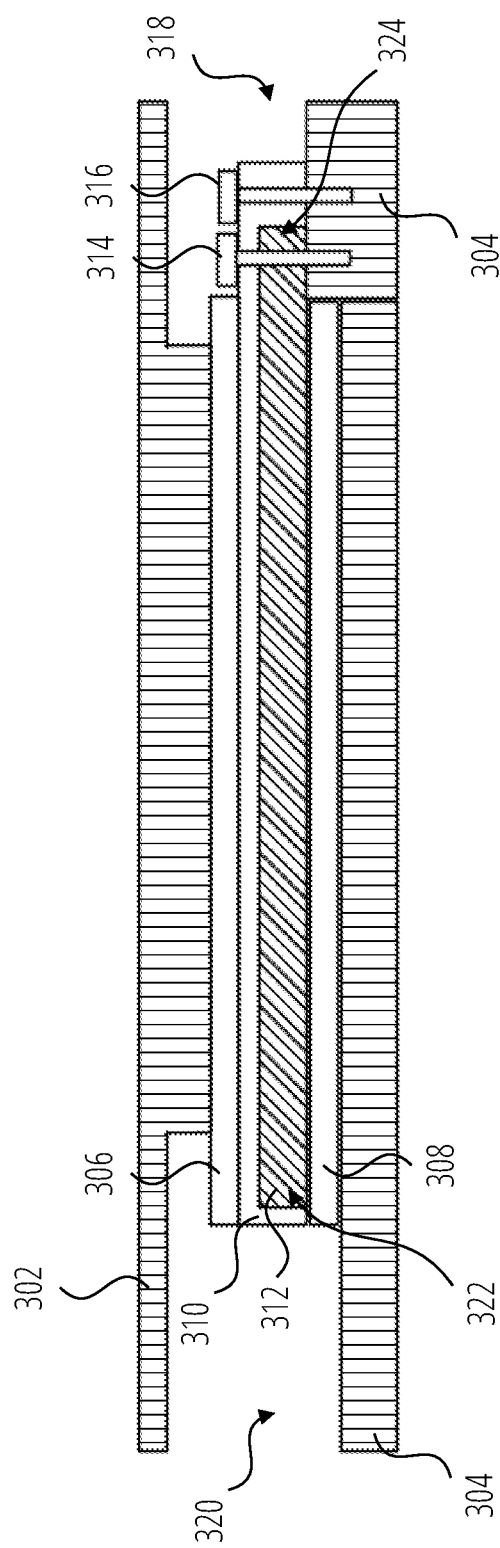
FIG. 3 illustrates a bottom cross-sectional view of an optical element and optical element holder of a head-worn device, in accordance with some examples.

FIG. 3 shows a bottom cross-sectional view of an optical element (e.g., right optical element 110) and optical element holder (right optical element holder 106) of a head-worn device, showing a waveguide having one end coupled to the frame and another end decoupled from the frame. By fixedly mounting the waveguide at a first end (e.g., the end near the input optical element 222 and projector 204) and allowing the rest of the waveguide to float freely, the free end of the waveguide functions like a cantilever beam.

In the illustrated example, the right optical element 110 consists of only a single waveguide 312 (although later described examples may also incorporate lenses and/or other components into the right optical element 110). The waveguide 312 is sandwiched between a world side frame 302 and an eye side frame 304, which jointly form the right optical element holder 106. The waveguide 312 is strengthened through the use of a rim 310 made out of a rigid material such as carbon fiber, metal, or glass filled plastic. As shown, the rim 310 extends around the perimeter of the waveguide 312 and also extends over a portion of the outer (i.e., world-side) surface of the waveguide 312 near the perimeter of the waveguide 312. In some examples, such as those shown in FIG. 4 through FIG. 7, the rim 310 is constructed to include mounting features for connection with the frame. The rim 310 can be attached to the waveguide 312 by any suitable means, such as an adhesive.

In some examples, the rim 310 is attached to only a portion of the perimeter of the waveguide 312. For example, the rim 310 may be attached to the waveguide 312 only near the first end 324 of the waveguide 312—in some examples, this localized connection may avoid potential damage to the waveguide 312 caused by contraction or expansion of the rim 310 during temperature changes. In some examples, the rim 310 is attached to the perimeter of the waveguide 312 at a small spatial remove or gap, using an adhesive or other attachment means having a degree of elasticity or deformability, to prevent such damage.

The waveguide 312 has a first end 324 and a second end 322. In some examples, the waveguide 312 is substantially circular, ovoid, or rectangular in shape, and the first end 324 and second end 322 correspond to substantially opposite points, sides, or corners thereof. The first end 324 is fixedly coupled to the frame 102 (e.g., to the eye side frame 304) at a first portion 318 thereof, whereas the second end 322 is proximate to a second portion 320 of the frame 102 but detached from the frame 102.

In some examples, the coupling of the waveguide 312 to the frame 102 is effected by a coupling of the waveguide 312 to the rim 310, and a coupling of the rim 310 to the frame 102. The rim 310 encircles the circumference of the waveguide 312, effecting a fixed coupling to the first end 324 and the second end 322 of the waveguide 312. The rim 310 is fixedly coupled to the eye side frame 304 by means of one or more screws, shown as screw 314 and screw 316. In other examples, different attachment means may be used to couple the rim 310 to the eye side frame 304, such as one or more threaded rods, clamps, adhesives, and/or welds.

In order to avoid contact with the frame during frame bending, and to protect against dynamic events such as drops, the waveguide 312 is spatially separated from the world side frame 302 and eye side frame 304. In the illustrated example, at least a portion of the spaces separating the waveguide 312 from the world side frame 302 and the eye side frame 304 are filled with a deformable element, such as a shock-absorbing foam material, shown in FIG. 3 as world side foam 306 between the waveguide and the world side frame 302 and eye side foam 308 between the waveguide and the eye side frame 304.

Figure 4:
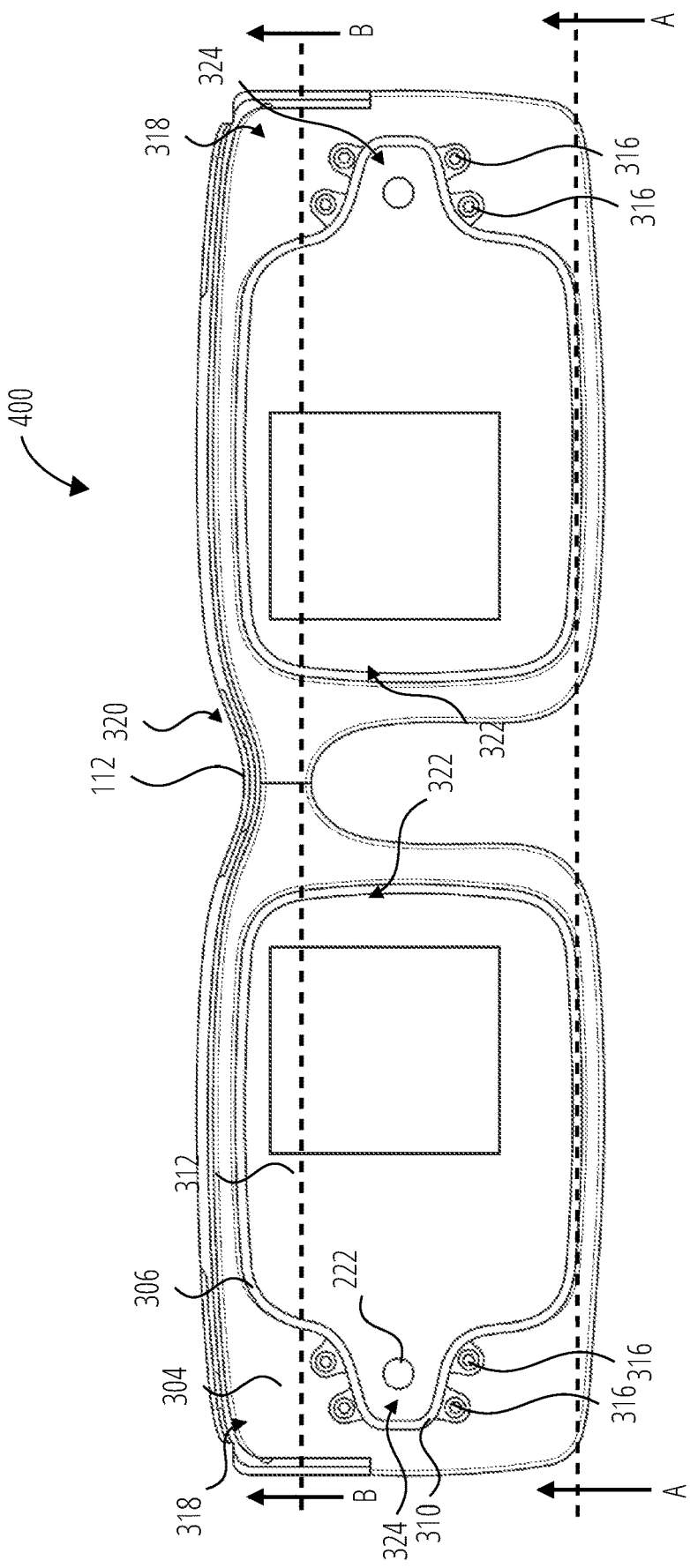
FIG. 4 illustrates a front view of a head-worn device with a front frame portion removed, in accordance with some examples.

FIG. 4 shows a front view of a further example of a head-worn device 400 with a front frame portion (e.g., world side frame 302) removed. As in FIG. 1 through FIG. 3, the head-worn device 400 is shown as a pair of XR glasses.

The components of the head-worn device 400 shown in FIG. 4 include the back portion of the frame 102 (e.g., eye side frame 304), with each waveguide 312 mounted to the eye side frame 304 via a respective rim 310 by means of screws 316. World side foam 306 covers the front (i.e., world side) surface of the rim 310. The eye side foam 308 is not visible, as it is located behind the rim 310 in this view. It can be seen that the rim 310 encompasses the perimeter of the waveguide 312 and extends onto a small portion of the world side surface of the waveguide 312. This portion of the rim 310 is covered by the world side foam 306.

The first end 324 of the waveguide 312 is shown fixedly or rigidly coupled to a first portion 318 of the eye side frame 304 (near input optical element 222) via the screws 316 passing through the rim 310, to which the waveguide 312 is coupled by adhesive or other means. However, the second end 322 of the waveguide 312 is detached from the second portion 320 of the eye side frame 304 (near bridge 112) and may move freely with respect thereto. In some examples, the world side foam 306 (and/or the eye side foam 308, not visible) is attached only to the waveguide 312 (e.g., via rim 310) and not to the frame 102, allowing the waveguide 312 and the foam to freely slide or otherwise move relative to the frame 102. In other examples, the world side foam 306 (and/or the eye side foam 308, not visible) is attached only to the frame 102 and not to the waveguide 312 (e.g., not attached to the rim 310), allowing the waveguide 312 to freely move relative to the foam.

Cross-sectional views of this partial configuration of the device, through lines A-A and B-B, are described below with reference to FIG. 6 and FIG. 7, respectively.

Figure 5:
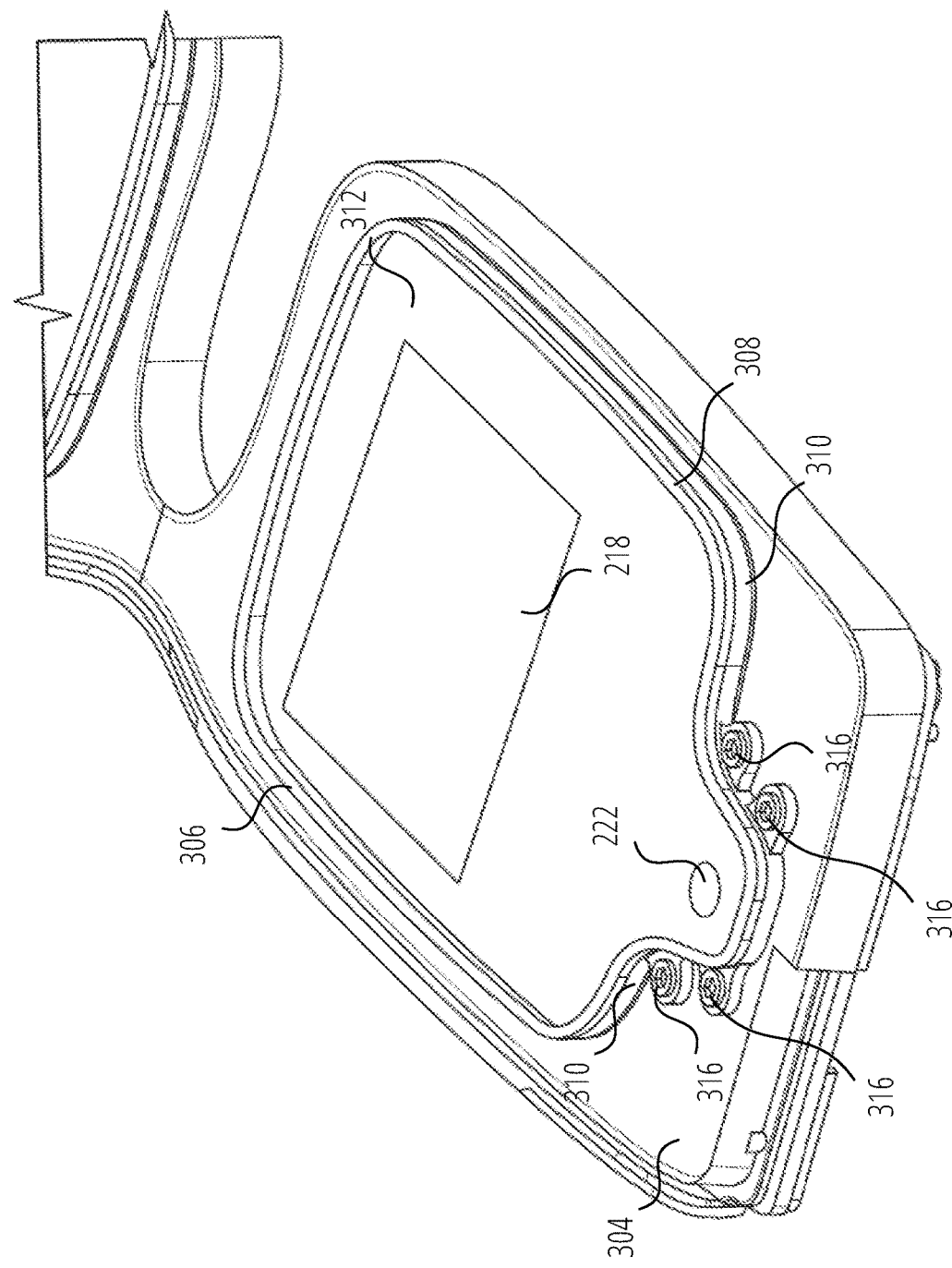
FIG. 5 illustrates a close-up partial perspective view of the head-worn device of FIG. 4, in accordance with some examples.

FIG. 5 is a close-up partial perspective view of the head-worn device 400 of FIG. 4 with the world side frame 302 removed. Further detail can be seen of the various layers: the eye side foam 308 resides between the eye side frame 304 and a bottom surface of the waveguide 312, the rim 310 encircles the waveguide 312 and covers a portion of the top surface around the perimeter of the waveguide 312, and the world side foam 306 covers the top surface of the rim 310. The rim 310 is secured to the eye side frame 304 using the screws 316, but the second end 322 of the waveguide 312 is not attached to the eye side frame 304 or any other part of the frame 102.

The illustrated examples use screws 316 to fixedly couple the rim 310 to the eye side frame 304. However, it will be appreciated that, in various examples, other coupling means such as adhesives, welding, or other means could be used in place of (or in addition to) screws. The number and location of the screws 316 can also vary in different examples, depending on the waveguide 312 profile and specific design requirements. In some examples, the rim 310 or waveguide 312 may be coupled to the world side frame 302 instead of the eye side frame 304.

Figure 6:
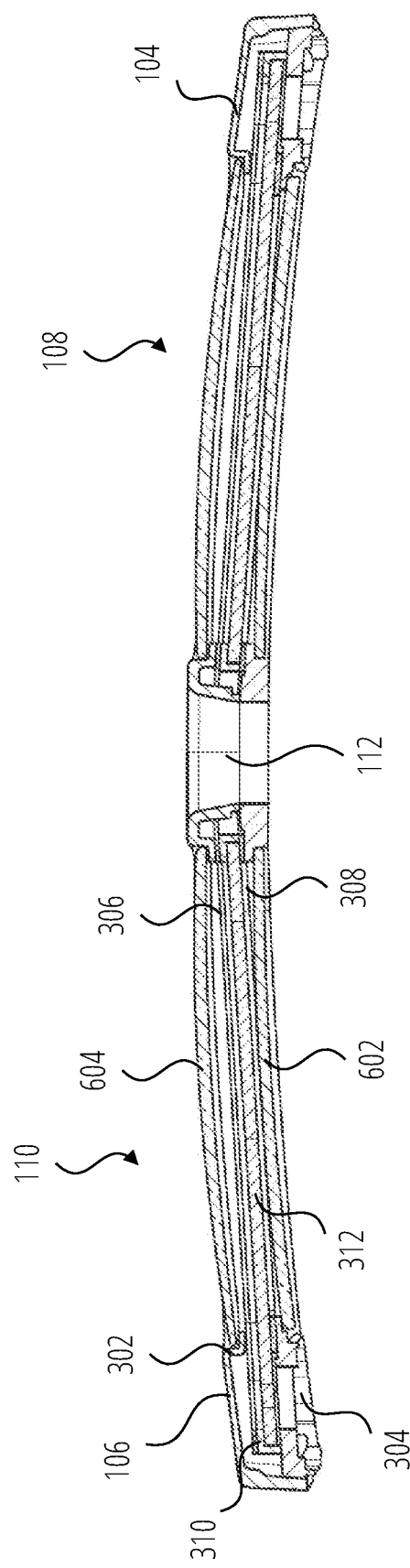
FIG. 6 illustrates a bottom cutaway view, along line A-A of FIG. 4, of the optical elements and optical element holders of the head-worn device of FIG. 4, in accordance with some examples.

FIG. 6 illustrates a bottom cutaway view, along line A-A of FIG. 4, of the optical elements 108, 110 and optical element holders 104, 106 of the head-worn device 400 device of FIG. 4. In this example, unlike the partial view of FIG. 4, the world side frame 302 is in place and visible. Furthermore, the optical elements 108, 110 in this example include lenses sandwiching the waveguide 312 between them: a world side lens 604 and an eye side lens 602. These lenses 602, 604 may perform various functions, such as filtering environmental light (e.g., by the world side lens 604), providing ophthalmic adjustments (e.g., by the eye side lens 602), modulating the apparent view distance of virtual content projected by the waveguide 312 (e.g., by a combination of the eye side lens 602 and world side lens 604 acting as push-pull lenses), etc.

In some examples, the waveguide 312 may be combined with the lenses 602, 604 into a single module, which is then cantilevered and suspended between the world side frame 302 and eye side frame 304 in accordance with the techniques described herein.

Figure 7:
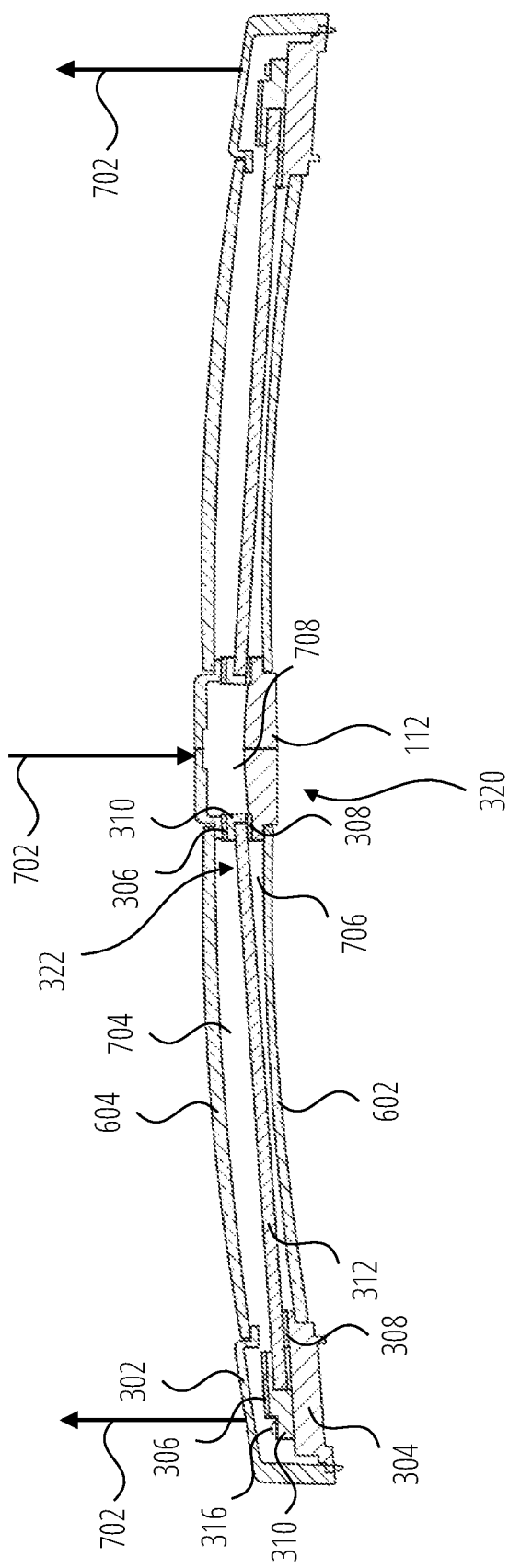
FIG. 7 illustrates a bottom cross-sectional view, along line B-B of FIG. 4, of the optical elements and optical element holders of the head-worn device of FIG. 4, in accordance with some examples.

FIG. 7 illustrates a bottom cross-sectional view, along line B-B of FIG. 4, of the optical elements and optical element holders of the head-worn device 400 of FIG. 4. As in FIG. 5, this view includes the world side frame 302 and lenses 602, 604. This cross-sectional view only shows components sectioned by line B-B in FIG. 4, unlike the cutaway view of FIG. 6 that shows components visible behind the cutaway through line A-A.

The placement of the eye side foam 308 is shown in FIG. 7 as a thin strip between the waveguide 312 and the world side frame 302. At the second end 322 of the waveguide 312 near the bridge 112, the eye side foam 308 also sits below a small portion of rim 310.

FIG. 7 shows typical deformation forces 702 acting to bend the frame 102 such that the bridge 112 is displaced downward (in this view) relative to the outer ends of the frame 102, thus flattening the front of the frame 102. These deformation forces 702 are typical of the effect of placing the glasses on a user's head: the arms are pulled outward to fit onto the sides of the head, thereby causing the front of the frame 102 to flatten.

It will be appreciated that, during such deformation, the waveguide 312 should be spaced apart sufficiently from the lenses 602 and 604 (by space 704 and space 706, respectively) to prevent contact therewith. Furthermore, during such deformation, the second end 322 of the waveguide 312 will be displaced relative to the second portion 320 of the frame 102 (near the bridge 112): the waveguide 312 may slide, pivot, or otherwise move inward toward the center of the bridge 112 and/or may pivot with respect to the world side frame 302 and eye side frame 304. Accordingly, the world side foam 306 and eye side foam 308 may be configured to permit such sliding and/or pivoting without placing mechanical load on the second end 322 of the waveguide 312, and the bridge 112 may include a cavity 708 to accommodate such movement.

Figure 8:
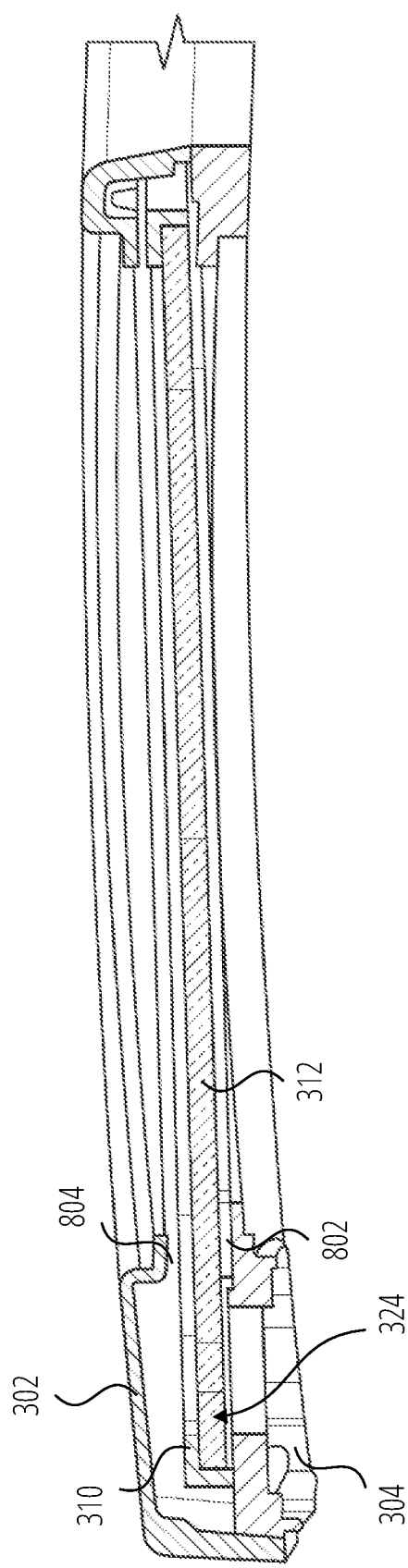
FIG. 8 illustrates a bottom cutaway view of a further example of an optical element and optical element holder of a head-worn device, in accordance with some examples.

FIG. 8 illustrates a bottom cutaway view of a further example of an optical element and optical element holder of a head-worn device, in accordance with some examples. In this example, the foam 306, 308 is omitted. Instead, a space 802 is provided between the waveguide 312 and the eye side frame 304, and space 804 is provided between the top surface of the rim 310 and the world side frame 302. These spaces 802, 804 allow the frame 102 to deform without coming into contact with the waveguide 312 or rim 310 other than the coupling (e.g., the screws 316, not visible) at the first end 324.

Figure 9:
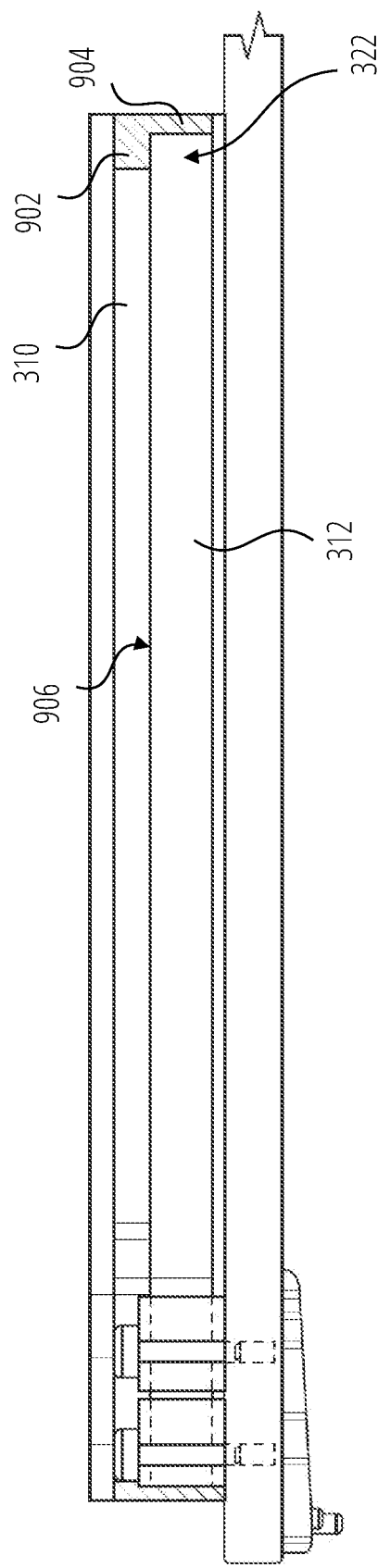
FIG. 9 illustrates a bottom cutaway view of a further example of an optical element and an eye side frame portion of an optical element holder of a head-worn device, in accordance with some examples.

FIG. 9 illustrates a bottom cutaway view of the right optical element 110 and right optical element holder 106 of the head-worn device 400 with the eye side frame 304 removed. Details of the shape of the rim 310 are shown in this view: in this example, the rim 310 includes a reinforcing portion 902 overhanging the world side surface 906 to reinforce the stiffness of the waveguide 312, as well as a perimeter portion 904 around the outside perimeter of the waveguide 312.

In various examples, the waveguide 312 can be assembled into the rim 310 using a variety of methods, such as glue, a pressure-sensitive adhesive (PSA), another adhesive, or another suitable fastening means.

Machine Architecture

Figure 10:
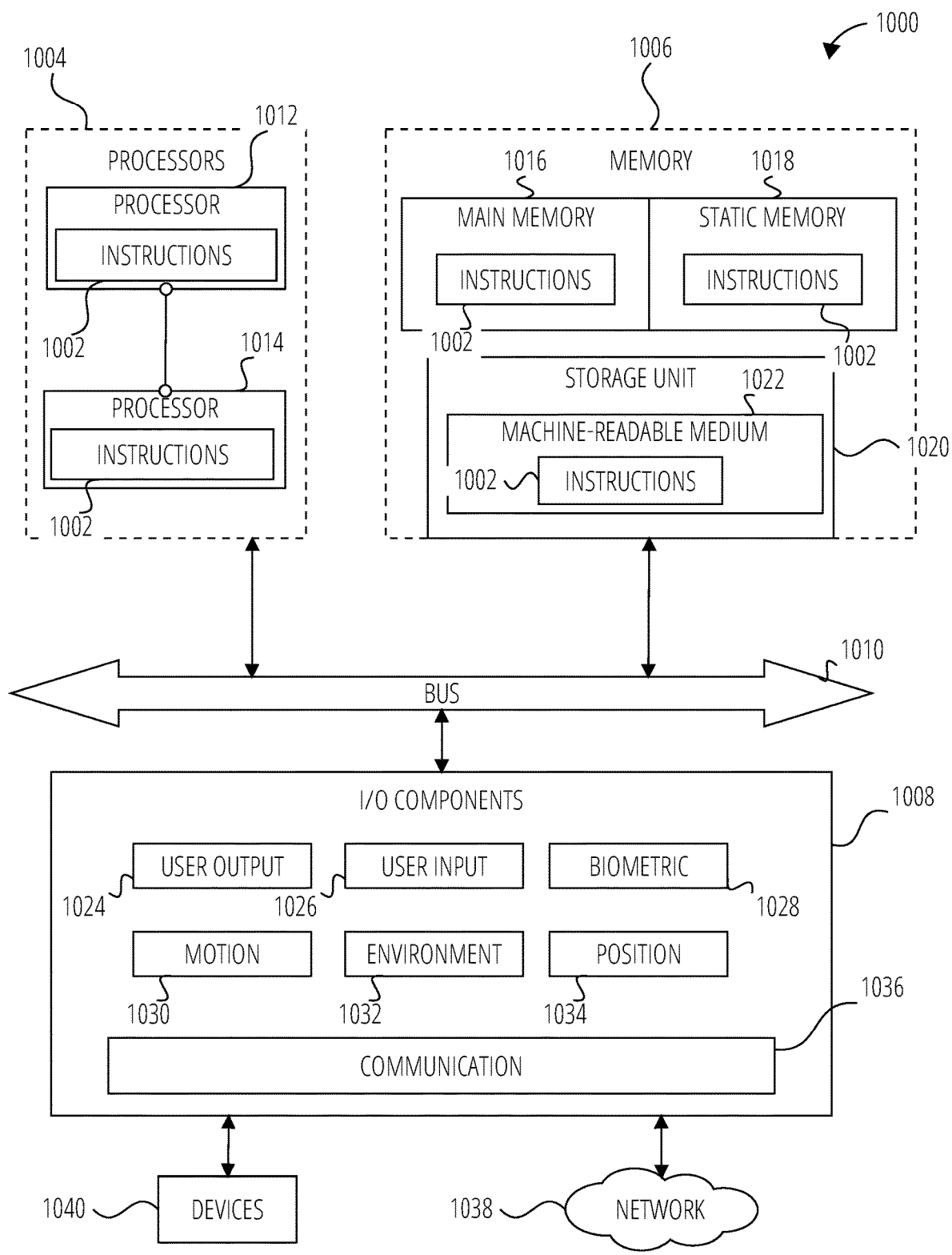
FIG. 10 is a diagrammatic representation of a machine in the form of a computer system within which a set of instructions may be executed to cause the machine to perform any one or more of the methodologies discussed herein, according to some examples.

FIG. 10 is a diagrammatic representation of a machine 1000 within which instructions 1002 (e.g., software, a program, an application, an applet, an app, or other executable code) for causing the machine 1000 to perform any one or more of the methodologies discussed herein. For example, the instructions 1002 may cause the machine 1000 to execute any one or more of the methods described herein. Alternatively, the machine 1000 may implement the XR display system of the glasses 100. The instructions 1002 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch, a pair of augmented reality glasses), a smart home device (e.g., a smart appliance), other smart devices, a web appliance, a network router, a network switch, a network bridge, or any machine capable of executing the instructions 1002 (e.g., an internet of things (IoT) device), sequentially or otherwise, that specify actions to be taken by the machine 1000. Further, while a single machine 1000 is illustrated, the term "machine" shall also be taken to include a collection of machines that individually or jointly execute the instructions 1002 to perform any one or more of the methodologies discussed herein. In some examples, the machine 1000 may comprise both client and server systems, with certain operations of a particular method or algorithm being performed on the server-side and with certain operations of the particular method or algorithm being performed on the client-side.

The machine 1000 may include processors 1004, memory 1006, and input/output I/O components 1008, which may be configured to communicate with each other via a bus 1010. In an example, the processors 1004 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1012 and a processor 1014 that execute the instructions 1002. The term "processor" is intended to include multi-core processors that may comprise two or more independent processors (sometimes referred to as "cores") that may execute instructions contemporaneously. Although FIG. 10 shows multiple processors 1004, the machine 1000 may include a single processor with a single-core, a single processor with multiple cores (e.g., a multi-core processor), multiple processors with a single core, multiple processors with multiples cores, or any combination thereof.

The memory 1006 includes a main memory 1016, a static memory 1018, and a storage unit 1020, both accessible to the processors 1004 via the bus 1010. The main memory 1006, the static memory 1018, and storage unit 1020 store the instructions 1002 embodying any one or more of the methodologies or functions described herein. The instructions 1002 may also reside, completely or partially, within the main memory 1016, within the static memory 1018, within machine-readable medium 1022 within the storage unit 1020, within at least one of the processors 1004 (e.g., within the processor's cache memory), or any suitable combination thereof, during execution thereof by the machine 1000.

The I/O components 1008 may include a wide variety of components to receive input, provide output, produce output, transmit information, exchange information, capture measurements, and so on. The specific I/O components 1008 that are included in a particular machine will depend on the type of machine. For example, portable machines such as mobile phones may include a touch input device or other such input mechanisms, while a headless server machine will likely not include such a touch input device. It will be appreciated that the I/O components 1008 may include many other components that are not shown in FIG. 10. In various examples, the I/O components 1008 may include user output components 1024 and user input components 1026. The user output components 1024 may include visual components (e.g., a display such as the display, a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1008 may include biometric components 1028, motion components 1030, environmental components 1032, or position components 1034, among a wide array of other components. For example, the biometric components 1028 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1030 include acceleration sensor components (e.g., accelerometer), gravitation sensor components, rotation sensor components (e.g., gyroscope).

The environmental components 1032 include, for example, one or more cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), depth sensors (such as one or more LIDAR arrays), or other components that may provide indications, measurements, or signals corresponding to a surrounding physical environment.

With respect to cameras, the machine 1000 may have a camera system comprising, for example, front cameras on a front surface of the machine 1000 and rear cameras on a rear surface of the machine 1000. The front cameras may, for example, be used to capture still images and video of a user of the machine 1000 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the machine 1000 may also include a 360° camera for capturing 360° photographs and videos.

Further, the camera system of the machine 1000 may include dual rear cameras (e.g., a primary camera as well as a depth-sensing camera), or even triple, quad or penta rear camera configurations on the front and rear sides of the machine 1000. These multiple cameras systems may include a wide camera, an ultra-wide camera, a telephoto camera, a macro camera, and a depth sensor, for example. The system may additionally include infra-red cameras to permit hand gesture tracking, eye position tracking or night vision, for example.

The position components 1034 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1008 further include communication components 1036 operable to couple the machine 1000 to a network 1038 or devices 1040 via respective coupling or connections. For example, the communication components 1036 may include a network interface component or another suitable device to interface with the network 1038. In further examples, the communication components 1036 may include wired communication components, wireless communication components, cellular communication components, satellite communication, Near Field Communication (NFC) components, Bluetooth® components (e.g., Bluetooth® Low Energy), Wi-Fi® components, Zigbee, Ant+, and other communication components to provide communication via other modalities. The devices 1040 may be another machine or any of a wide variety of peripheral devices (e.g., a peripheral device coupled via a USB).

Moreover, the communication components 1036 may detect identifiers or include components operable to detect identifiers. For example, the communication components 1036 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1036, such as location via Internet Protocol (IP) geolocation, location via Wi-Fi® signal triangulation, location via detecting an NFC beacon signal that may indicate a particular location, and so forth.

The various memories (e.g., main memory 1016, static memory 1018, and memory of the processors 1004) and storage unit 1020 may store one or more sets of instructions and data structures (e.g., software) embodying or used by any one or more of the methodologies or functions described herein. These instructions (e.g., the instructions 1002), when executed by processors 1004, cause various operations to implement the disclosed examples.

The instructions 1002 may be transmitted or received over the network 1038, using a transmission medium, via a network interface device (e.g., a network interface component included in the communication components 1036) and using any one of several well-known transfer protocols (e.g., hypertext transfer protocol (HTTP)). Similarly, the instructions 1002 may be transmitted or received using a transmission medium via a coupling (e.g., a peer-to-peer coupling) to the devices 1040.

Software Architecture

Figure 11:
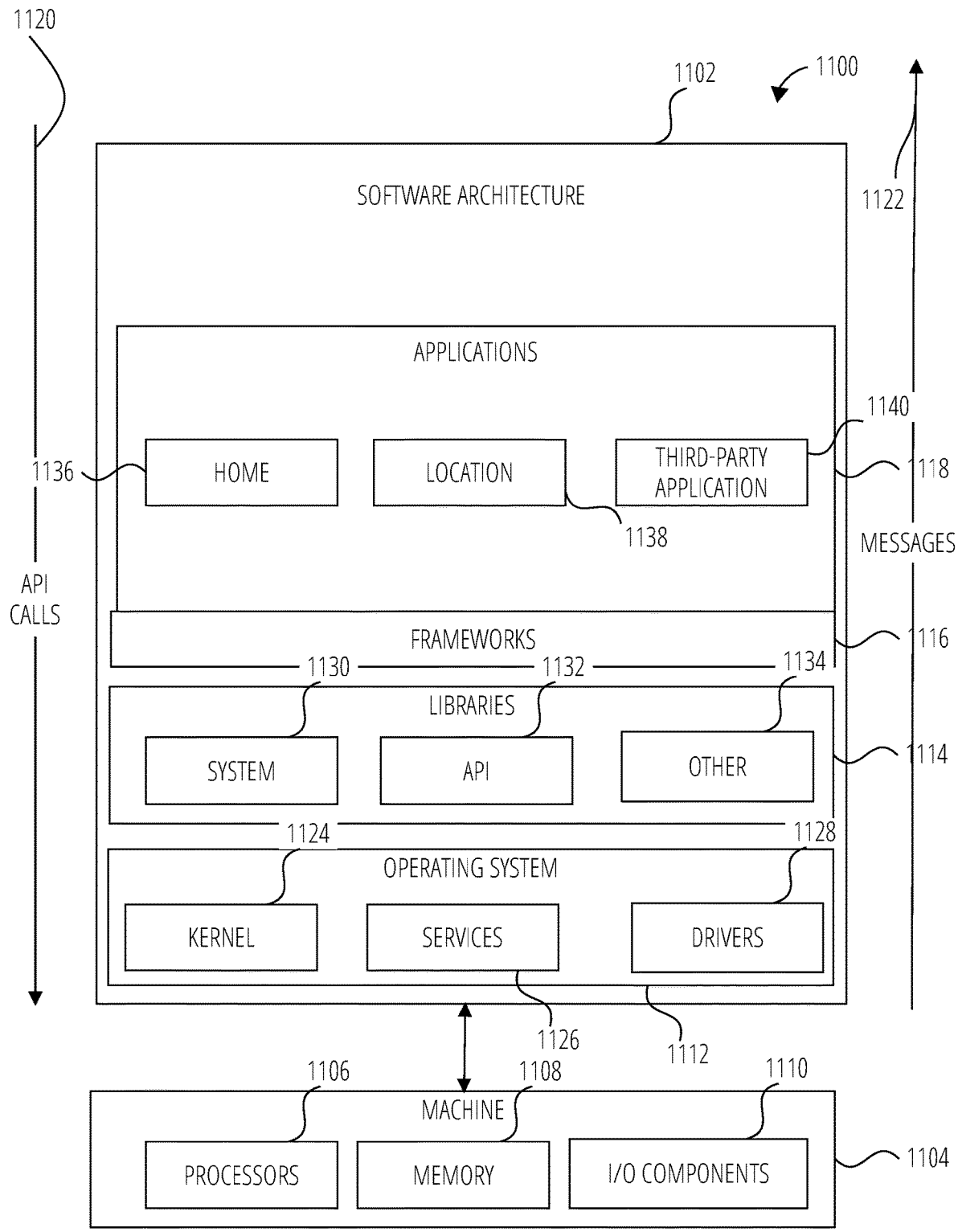
FIG. 11 is a block diagram showing a software architecture within which examples may be implemented.

FIG. 11 is a block diagram 1100 illustrating a software architecture 1102, which can be installed on any one or more of the devices described herein. The software architecture 1102 is supported by hardware such as a machine 1104 that includes processors 1106, memory 1108, and I/O components 1110. In this example, the software architecture 1102 can be conceptualized as a stack of layers, where each layer provides a particular functionality. The software architecture 1102 includes layers such as an operating system 1112, libraries 1114, frameworks 1116, and applications 1118. Operationally, the applications 1118 invoke API calls 1120 through the software stack and receive messages 1122 in response to the API calls 1120.

The operating system 1112 manages hardware resources and provides common services. The operating system 1112 includes, for example, a kernel 1124, services 1126, and drivers 1128. The kernel 1124 acts as an abstraction layer between the hardware and the other software layers. For example, the kernel 1124 provides memory management, processor management (e.g., scheduling), component management, networking, and security settings, among other functionalities. The services 1126 can provide other common services for the other software layers. The drivers 1128 are responsible for controlling or interfacing with the underlying hardware. For instance, the drivers 1128 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1114 provide a common low-level infrastructure used by the applications 1118. The libraries 1114 can include system libraries 1130 (e.g., C standard library) that provide functions such as memory allocation functions, string manipulation functions, mathematic functions, and the like. In addition, the libraries 1114 can include API libraries 1132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1114 can also include a wide variety of other libraries 1134 to provide many other APIs to the applications 1118.

The frameworks 1116 provide a common high-level infrastructure that is used by the applications 1118. For example, the frameworks 1116 provide various graphical user interface (GUI) functions, high-level resource management, and high-level location services. The frameworks 1116 can provide a broad spectrum of other APIs that can be used by the applications 1118, some of which may be specific to a particular operating system or platform.

In an example, the applications 1118 may include a home application 1136, a location application 1138, and a broad assortment of other Applications such as a third-party application 1140. The applications 1118 are programs that execute functions defined in the programs. Various programming languages can be employed to create one or more of the applications 1118, structured in a variety of manners, such as object-oriented programming languages (e.g., Objective-C, Java, or C++) or procedural programming languages (e.g., C or assembly language). In a specific example, the third-party application 1140 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1140 can invoke the API calls 1120 provided by the operating system 1112 to facilitate functionalities described herein.

Figure 12:
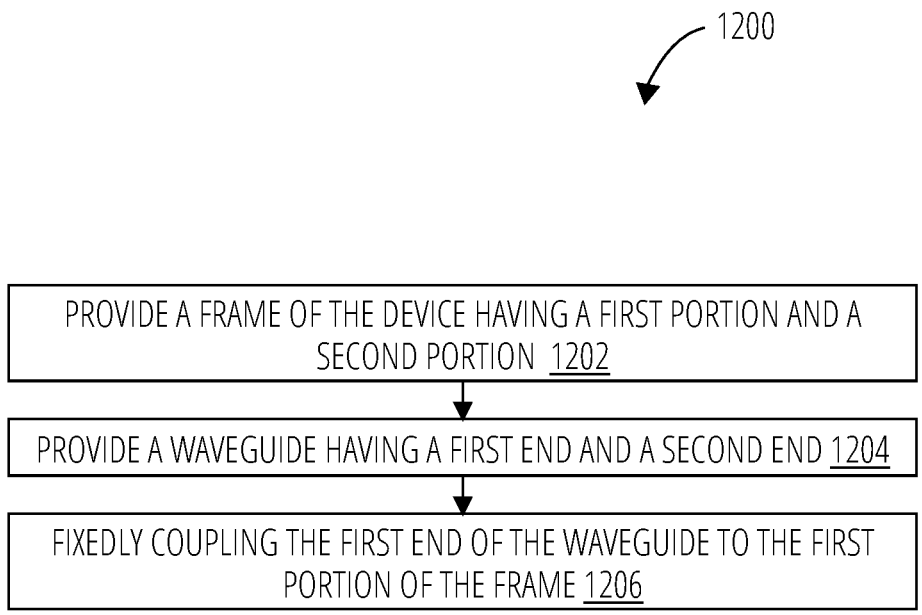
FIG. 12 illustrates a method of manufacturing a device, in accordance with one embodiment.

FIG. 12 shows a method 1200 of manufacturing a device in accordance with examples described herein. Although the example method 1200 depicts a particular sequence of operations, the sequence may be altered without departing from the scope of the present disclosure. For example, some of the operations depicted may be performed in parallel or in a different sequence that does not materially affect the function of the method 1200. In other examples, different components of an example device or system that implements the method 1200 may perform functions at substantially the same time or in a specific sequence.

At operation 1202, a frame of the device is provided, having a first portion and a second portion. At operation 1204, a waveguide is provided having a first end and a second end. At operation 1206, the first end of the waveguide is fixedly coupled to the first portion of the frame, such that the second end of the waveguide is proximal to the second portion of the frame and detached from the frame, and such that, when the frame deforms to displace the first portion and the second portion relative to each other, the second end of the waveguide is not displaced relative to the first end of the waveguide as a result of the frame deforming.

CONCLUSION

Thus, in some examples, a head-worn device is provided that has a waveguide fixedly coupled to the frame of the device at a first end but not at a second end to form a cantilevered structure. Examples described herein may attempt to address one or more technical problems arising with respect to light-projecting devices using waveguides, such as XR displays, and in particular, head-worn XR displays.

By permitting the second end of the waveguide to freely move relative to the frame, some examples may reduce or eliminate waveguide bending due to frame deflection, thus maintaining higher optical performance, in particular MTF. In some examples, the overall frame stiffness can be reduced as long as sufficient clearance is maintained to the waveguide. Reduced frame stiffness can improve wearer comfort, and may allow for lighter weight materials to be used and/or for a reduced mass of material to be used in forming the frames, again resulting in improved wearer comfort. The use of less mass and/or lighter materials for the frames can also potentially reduce cost, as less material is needed, and potentially cheaper materials and construction methods can be used.

In some examples, a fragile waveguide (e.g., a glass waveguide) can be securely reinforced by mounting the waveguide into a stiff rim of material around its perimeter. The rim may help to support the waveguide during dynamic loading, such as that which may occur when the frame is dropped or collides with another object. Because the waveguide is made of high index optical material such as glass, it may be very susceptible to cracking due to shock or impact events. In some examples, the waveguide may be attached to the rim at only a portion of its perimeter, and/or having a gap filled with a deformable adhesive material to prevent damage due to contraction and/or expansion of the rim during temperature changes.

In some examples, shock-absorbing foam or another deformable element can be used in the cantilevered sections of the waveguide to provide additional support to the waveguide during shock or impact events. The shock-absorbing foam may provide support during transient loading (e.g., shock), but is soft and compliant during steady state loading. This allows the gap or space between the waveguide and the frame to increase or decrease as needed during bending loads when worn, without placing significant mechanical load on the waveguide.

Example 1 is a device comprising: a frame; and a waveguide having: a first end fixedly coupled to a first portion of the frame; and a second end proximal to a second portion of the frame and detached from the frame, such that, when the frame deforms to displace the first portion and the second portion relative to each other, the second end of the waveguide is not displaced relative to the first end of the waveguide as a result of the frame deforming.

In Example 2, the subject matter of Example 1 includes, wherein: the device is a head-worn device; the frame is configured to mount the device on a human head; and the waveguide comprises a near-eye display.

In Example 3, the subject matter of Example 2 includes, wherein: the waveguide comprises an input optical element proximal to the first end configured to couple light into the waveguide; and the device further comprises a projector coupled to the frame and configured to project light toward the input optical element.

In Example 4, the subject matter of Examples 1-3 includes, wherein: the device further comprises a rim fixedly coupled to the first end and the second end of the waveguide; and the waveguide is fixedly coupled to the first portion of the frame by means of a fixed coupling between the rim and the first portion of the frame.

In Example 5, the subject matter of Example 4 includes, wherein the fixed coupling between the rim and the first portion of the frame comprises one or more screws.

In Example 6, the subject matter of Examples 4-5 includes, wherein the rim is rigid.

In Example 7, the subject matter of Example 6 includes, wherein: the waveguide has a surface extending between the first end and the second end; and the rim extends over a portion of the surface proximate to the second end, thereby increasing a rigidity of the waveguide.

In Example 8, the subject matter of Examples 6-7 includes, wherein the rim comprises at least one of: carbon fiber, metal, or glass filled plastic.

In Example 9, the subject matter of Examples 4-8 includes, wherein the rim is fixedly coupled to the waveguide using an adhesive.

In Example 10, the subject matter of Examples 1-9 includes a deformable element, situated between the second end of the waveguide and the second portion of the frame, configured to: prevent contact between the second end of the waveguide and the second portion of the frame; and act as a shock absorber to protect the waveguide against transient loading.

In Example 11, the subject matter of Example 10 includes, wherein the deformable element comprises a foam.

In Example 12, the subject matter of Examples 10-11 includes, wherein the deformable element is attached to the frame but detached from the waveguide, such that the waveguide can freely move relative to the deformable element.

In Example 13, the subject matter of Example 12 includes, wherein the deformable element is attached to the frame using an adhesive.

In Example 14, the subject matter of Examples 10-13 includes, wherein the deformable element is attached to the waveguide but detached from the frame, such that the waveguide and deformable element can freely move relative to the frame.

In Example 15, the subject matter of Example 14 includes, wherein the deformable element is attached to the waveguide using an adhesive.

In Example 16, the subject matter of Examples 1-15 includes, wherein the first end of the waveguide is fixedly coupled to the first portion of the frame using one or more of: a screw, a threaded rod, a clamp, an adhesive, or a weld.

In Example 17, the subject matter of Examples 1-16 includes, wherein the waveguide comprises glass.

In Example 18, the subject matter of Examples 1-17 includes, wherein: the device further comprises a lens extending between the first portion of the frame and the second portion of the frame; and the lens is spaced sufficiently from the waveguide to prevent contact between the lens and the waveguide when the frame is deformed.

Example 19 is a method of manufacturing a device, comprising: providing a frame of the device having a first portion and a second portion; providing a waveguide having a first end and a second end; and fixedly coupling the first end of the waveguide to the first portion of the frame, such that the second end of the waveguide is proximal to the second portion of the frame and detached from the frame, and such that, when the frame deforms to displace the first portion and the second portion relative to each other, the second end of the waveguide is not displaced relative to the first end of the waveguide as a result of the frame deforming.

Example 20 is a device comprising: a frame; and a waveguide having: a first end coupled to a first portion of the frame; and a second end proximal to a second portion of the frame and detached from the frame, such that the second end of the waveguide can move freely relative to the second portion of the frame.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Changes and modifications may be made to the disclosed examples without departing from the scope of the present disclosure. These and other changes or modifications are intended to be included within the scope of the present disclosure, as expressed in the following claims.

Glossary

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology. The term "network", as used herein, shall refer to a communication network unless otherwise indicated.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action, or an interaction with other users or computer systems.

What is claimed is:

1. A device comprising:
a frame;
a waveguide having:
a first end fixedly coupled to a first portion of the frame; and
a second end proximal to a second portion of the frame and detached from the frame, such that, when the frame deforms to displace the first portion and the second portion relative to each other, the second end of the waveguide is not displaced relative to the first end of the waveguide as a result of the frame deforming; and
a rim coupled to the first end and the second end of the waveguide, the first end of the waveguide being fixedly coupled to the first portion of the frame by means of a fixed coupling between the rim and the first portion of the frame.

2. The device of claim 1, wherein:
the device is a head-worn device;
the frame is configured to mount the device on a human head; and
the waveguide comprises a near-eye display.

3. The device of claim 2, wherein:
the waveguide comprises an input optical element proximal to the first end configured to couple light into the waveguide; and
the device further comprises a projector coupled to the frame and configured to project light toward the input optical element.

4. The device of claim 1, wherein the fixed coupling between the rim and the first portion of the frame comprises one or more screws.

5. The device of claim 1, wherein the rim is rigid.

6. The device of claim 5, wherein:
the waveguide has a surface extending between the first end and the second end; and
the rim extends over a portion of the surface proximate to the second end, thereby increasing a rigidity of the waveguide.

7. The device of claim 5, wherein the rim comprises at least one of: carbon fiber, metal, or glass filled plastic.

8. The device of claim 1, wherein the rim is coupled to waveguide using an adhesive.

9. The device of claim 1, further comprising:
a deformable element, situated between the second end of the waveguide and the second portion of the frame, configured to:
prevent contact between the second end of the waveguide and the second portion of the frame; and
act as a shock absorber to protect the waveguide against transient loading.

10. The device of claim 9, wherein the deformable element comprises a foam.

11. The device of claim 9, wherein the deformable element is attached to the frame but detached from the waveguide, such that the waveguide can freely move relative to the deformable element.

12. The device of claim 11, wherein the deformable element is attached to the frame using an adhesive.

13. The device of claim 9, wherein the deformable element is attached to the waveguide but detached from the frame, such that the waveguide and deformable element can freely move relative to the frame.

14. The device of claim 13, wherein the deformable element is attached to the waveguide using an adhesive.

15. The device of claim 1, wherein the first end of the waveguide is fixedly coupled to the first portion of the frame using one or more of: a screw, a threaded rod, a clamp, an adhesive, or a weld.

16. The device of claim 1, wherein the waveguide comprises glass.

17. The device of claim 1, wherein:
the device further comprises a lens extending between the first portion of the frame and the second portion of the frame; and
the lens is spaced sufficiently from the waveguide to prevent contact between the lens and the waveguide when the frame is deformed.

18. A method of manufacturing a device, comprising:
providing a frame of the device having a first portion and a second portion;
providing a waveguide having a first end and a second end;
coupling a rim to the first end and the second end of the waveguide; and
fixing the first end of the waveguide to the first portion of the frame by means of a fixed coupling between the rim and the first portion of the frame,
such that the second end of the waveguide is proximal to the second portion of the frame and detached from the frame, and
such that, when the frame deforms to displace the first portion and the second portion relative to each other, the second end of the waveguide is not displaced relative to the first end of the waveguide as a result of the frame deforming.

19. A device comprising:
a frame;
a waveguide having:
  a first end coupled to a first portion of the frame; and
  a second end proximal to a second portion of the frame and detached from the frame, such that the second end of the waveguide can move freely relative to the second portion of the frame; and
a rim coupled to the first end and the second end of the waveguide, the first end of the waveguide being fixedly coupled to the first portion of the frame by means of a fixed coupling between the rim and the first portion of the frame.

20. The device of claim 19, wherein:
the device is a head-worn device;
the frame is configured to mount the device on a human head; and
the waveguide comprises a near-eye display.

* * * * *